US 12,434,625 B2

(12) United States Patent
Konno (10) Patent No.: US 12,434,625 B2
(45) Date of Patent: Oct. 7, 2025

(54) VEHICLE PROXIMITY NOTIFICATION DEVICE, VEHICLE PROXIMITY NOTIFICATION METHOD, AND MOBILE DEVICE

(71) Applicant: Panasonic Intellectual Property Management Co., Ltd., Osaka (JP)

(72) Inventor: Fumiyasu Konno, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 129 days.

(21) Appl. No.: 18/375,277

(22) Filed: Sep. 29, 2023

(65) Prior Publication Data

US 2024/0109486 A1    Apr. 4, 2024

(30) Foreign Application Priority Data

Oct. 4, 2022   (JP) .................. 2022-159930

(51) Int. Cl.
*B60Q 5/00* (2006.01)
*H04R 1/22* (2006.01)

(52) U.S. Cl.
CPC .............. *B60Q 5/006* (2013.01); *H04R 1/22* (2013.01); *H04R 2430/01* (2013.01); *H04R 2499/13* (2013.01)

(58) Field of Classification Search
CPC .......... B60Q 5/006; B60Q 5/008; H04R 3/04; H04R 1/22; H04R 2430/01; H04R 2430/03; H04R 2499/13; G10K 15/02
See application file for complete search history.

(56) References Cited

U.S. PATENT DOCUMENTS

| | | | |
|---|---|---|---|
| 10,414,336 B1* | 9/2019 | Harper | B60Q 5/008 |
| 2018/0118107 A1* | 5/2018 | You | G08G 1/005 |
| 2020/0238902 A1* | 7/2020 | Pyzik | B60Q 5/008 |
| 2023/0353939 A1* | 11/2023 | Yamamoto | B60Q 5/00 |

FOREIGN PATENT DOCUMENTS

| | | |
|---|---|---|
| JP | 05-208636 | 8/1993 |
| JP | 11-285093 | 10/1999 |
| JP | 2022-011194 | 1/2022 |

* cited by examiner

*Primary Examiner* — Jason R Kurr
(74) *Attorney, Agent, or Firm* — Greenblum & Bernstein, P.L.C.

(57) ABSTRACT

A vehicle proximity device includes: an obtainer that obtains a first audio signal obtained by extracting a first frequency band of a first sound source signal and a second audio signal obtained by extracting a second frequency band thereof; a simulated signal processor that generates a simulated signal based on a second sound source signal; a third filter that generates a third audio signal by extracting the first frequency band of the simulated signal; a fourth filter that generates a fourth audio signal by extracting the second frequency band of the simulated signal; a sound pressure adjuster that generates an output audio signal by adjusting the simulated signal to reduce a first difference between the first audio signal and the third audio signal and a second difference between the second audio signal and the fourth audio signal; and an outputter that outputs the output audio signal to the loudspeaker.

6 Claims, 5 Drawing Sheets

VEHICLE PROXIMITY NOTIFICATION DEVICE, VEHICLE PROXIMITY NOTIFICATION METHOD, AND MOBILE DEVICE

CROSS REFERENCE TO RELATED APPLICATION

The present application is based on and claims priority of Japanese Patent Application No. 2022-159930 filed on Oct. 4, 2022.

FIELD

The present disclosure relates to a vehicle proximity notification device that is mounted on a vehicle and outputs an alarm sound to notify the outside of the approach of the vehicle, a vehicle proximity notification method therefor, and a mobile device including the vehicle proximity notification device.

BACKGROUND

Since electric vehicles and hybrid vehicles make less noise, there is a problem that pedestrians and the like are less likely to notice the approach of the vehicle when the vehicle is traveling at low speeds with little own vehicle road noise. For this reason, in low-noise vehicles such as electric vehicles and hybrid vehicles, a vehicle proximity notification device that warns pedestrians of an approaching vehicle by generating an alarm sound, which is a continuous sound that evokes the travelling state of the vehicle during travelling is provided (see Patent Literature (PTL) 1 and 2, for example).

CITATION LIST

Patent Literature

PTL 1: Japanese Unexamined Patent Application Publication No. H5-208636
PTL 2: Japanese Unexamined Patent Application Publication No. H11-285093

SUMMARY

However, the vehicle proximity notification devices according to PTL 1 and 2 can be improved upon.

In view of this, the present disclosure provides a vehicle proximity notification device capable of improving upon the above related art.

The vehicle proximity notification device according to an aspect of the present disclosure is a vehicle proximity notification device that notifies of proximity of a vehicle by causing a loudspeaker disposed in the vehicle to output an alarm sound toward an outside of the vehicle, the vehicle proximity notification device including: an obtainer that obtains a first audio signal obtained by extracting a first frequency band of a first sound source signal and a second audio signal obtained by extracting a second frequency band of the first sound source signal, the first sound source signal being applied with specific signal processing to give the first sound source signal, when output from the loudspeaker, (i) a sound pressure in the first frequency band greater than a stipulated first sound pressure and (ii) a sound pressure in a second frequency band different from the first frequency band greater than a stipulated second sound pressure; a simulated signal processor that generates a simulated signal by performing simulated signal processing on a second sound source signal different from the first sound source signal, the simulated signal processing including the specific signal processing and signal processing for simulating a characteristic of the loudspeaker; a third filter that generates a third audio signal by extracting the first frequency band of the simulated signal; a fourth filter that generates a fourth audio signal by extracting the second frequency band of the simulated signal; a sound pressure adjuster that generates an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal; and an outputter that outputs the output audio signal to the loudspeaker.

It should be noted that these general or specific aspects may be realized by a system, a method, an integrated circuit, a computer program, or a recording medium such as a computer-readable CD-ROM, or may be realized by any combination of a system, a method, an integrated circuit, a computer program, and a recording medium.

The vehicle proximity notification device and the like according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT (Underlying Knowledge Forming Basis of the Present Disclosure)

A conventional vehicle proximity notification device includes a loudspeaker that generates an alarm sound, a sound source that outputs a signal corresponding to the alarm sound, and an amplifier that amplifies the signal output from the sound source and outputs it to the loudspeaker. Such a vehicle proximity notification device is required to output a sound having a stipulated sound pressure at a stipulated frequency. When sound from various sound sources is set as an alarm sound, it is necessary to adjust the sound of each sound source so that a sound with a stipulated sound pressure or greater is output at a stipulated frequency.

The vehicle alarm sound source described in PTL 1 includes a vehicle exterior loudspeaker and a vehicle interior loudspeaker, a microphone provided at a position in the vehicle where sound reduction is desired, and an adaptive controller. The vehicle alarm sound source generates an alarm sound from the vehicle exterior loudspeaker via an amplifier with the reference signal. At this time, the adaptive controller identifies the inverse transfer characteristic with respect to the transfer characteristic of the vehicle interior space transfer system from the reference signal and the input of the microphone, and controls the sound output from the vehicle interior loudspeaker through the amplifier so that the input of the microphone is minimized.

In addition, the vehicle-mounted alarm sound device described in PTL 2 generates a control sound for controlling the directivity of the alarm sound, and changes the directivity of the alarm sound to a desired characteristic by signal processing.

As such, by generating an alarm sound toward the vehicle exterior, it is possible to notify pedestrians of the approach of the vehicle.

In addition, with regard to alarm sounds output from low-noise vehicles such as electric vehicles and hybrid vehicles, the North American National Highway Traffic Safety Administration (NHTSA) is considering stipulating minimum sound pressure values. For example, a minimum sound pressure value is stipulated for eight frequency bands of ⅓ octave, and it is necessary to output an alarm sound having a minimum sound pressure value or more when measured by a predetermined measurement method. Therefore, the sound pressure of the warning sound cannot be made smaller than the minimum sound pressure value. Therefore, there is a demand for a technology that reduces the discomfort given to passengers while outputting an alarm sound with a minimum sound pressure value or more.

In the conventional technology described above, when sound from various sound sources is set as an alarm sound, it is necessary to store the parameters determined by adjusting the sound pressure for each sound source while confirming whether the sound having a stipulated sound pressure or higher at a stipulated frequency is output for each sound source. As such, it is necessary to adjust the sound pressure for each sound source, and it takes efforts to adjust the sound pressure. In addition, it is necessary to secure a storage area of the storage for storing the determined parameters.

Therefore, the present disclosure provides a vehicle proximity notification device and the like that can adjust the sound of a sound source for which sound pressure adjustment has not been performed in advance so that a sound having a stipulated sound pressure or greater is output at a stipulated frequency.

In order to solve the above problems, a vehicle proximity notification device according to a first aspect of the present disclosure is a vehicle proximity notification device that notifies of proximity of a vehicle by causing a loudspeaker disposed in the vehicle to output an alarm sound toward an outside of the vehicle, the vehicle proximity notification device including: an obtainer that obtains a first audio signal obtained by extracting a first frequency band of a first sound source signal and a second audio signal obtained by extracting a second frequency band of the first sound source signal, the first sound source signal being applied with specific signal processing to give the first sound source signal, when output from the loudspeaker, (i) a sound pressure in the first frequency band greater than a stipulated first sound pressure and (ii) a sound pressure in a second frequency band different from the first frequency band greater than a stipulated second sound pressure; a simulated signal processor that generates a simulated signal by performing simulated signal processing on a second sound source signal different from the first sound source signal, the simulated signal processing including the specific signal processing and signal processing for simulating a characteristic of the loudspeaker; a third filter that generates a third audio signal by extracting the first frequency band of the simulated signal; a fourth filter that generates a fourth audio signal by extracting the second frequency band of the simulated signal; a sound pressure adjuster that generates an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal; and an outputter that outputs the output audio signal to the loudspeaker.

According to this, a sound pressure adjustment process for adjusting the sound pressure of the simulated signal is performed so that the sound pressure of each of the first frequency band and the second frequency band of the simulated signal obtained based on the second sound source signal for which sound pressure adjustment has not been performed in advance is brought close to the sound pressure of each of the first frequency band and the second frequency band in the first sound source signal for which sound pressure adjustment has been performed in advance. For this reason, even in the alarm sound based on the second sound source signal, the sound pressure in the first frequency band and the sound pressure in the second frequency band can be brought close to the sound based on the first sound source signal that has been adjusted in advance so as to satisfy the stipulation. Therefore, it is possible to adjust the sound of a sound source for which sound pressure adjustment has not been performed in advance so that a sound having a stipulated sound pressure or greater is output at a stipulated frequency.

A vehicle proximity notification device according to a second aspect of the present disclosure is the vehicle proximity notification device according to the first aspect, further including: a first filter that generates the first audio signal by extracting the first frequency band of the first sound source signal; and a second filter that generates the second audio signal by extracting the second frequency band of the first sound source signal.

For this reason, the first audio signal and the second audio signal can be generated based on the first sound source signal. Therefore, even if the first audio signal and the second audio signal are not stored, the first audio signal and the second audio signal that have been generated can be used for the sound pressure adjustment processing by the sound pressure adjuster, so that there is no need to ensure the storage capacity of the storage device for storing the first audio signal and the second audio signal.

In addition, a vehicle proximity notification device according to a third aspect of the present disclosure is the vehicle proximity notification device according to the first aspect or the second aspect, wherein the first frequency band is included in a low frequency band lower than a predetermined frequency, and the second frequency band is included in a high frequency band higher than or equal to the predetermined frequency.

For this reason, it is possible to generate sound that satisfies regulations based on the second sound source signal.

In addition, a vehicle proximity notification device according to a fourth aspect of the present disclosure is the vehicle proximity notification device according to the third aspect, wherein the first frequency band and the second frequency band are frequency bands that are not adjacent to each other among a plurality of frequency bands separated by every ⅓ octave.

For this reason, it is possible to generate sound that satisfies regulations based on the second sound source signal.

A vehicle proximity notification method according to a fifth aspect of the present disclosure is a vehicle proximity notification method for notifying of proximity of a vehicle by causing a loudspeaker disposed outside the vehicle compartment to output an alarm sound, the vehicle proximity notification method including: obtaining a first audio signal obtained by extracting a first frequency band of a first sound source signal and a second audio signal obtained by extracting a second frequency band of the first sound source signal, the first sound source signal being applied with specific signal processing to give the first sound source signal, when output from the loudspeaker, (i) a sound pressure in the first frequency band greater than a stipulated first sound pressure and (ii) a sound pressure in a second frequency band different from the first frequency band greater than a stipulated second sound pressure; generating a simulated signal by performing simulated signal processing on a second sound source signal different from the first sound source signal, the simulated signal processing including the specific signal processing and signal processing for simulating a characteristic of the loudspeaker; generating a third audio signal by extracting the first frequency band of the simulated signal; generating a fourth audio signal by extracting the second frequency band of the simulated signal; generating an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal; and outputting the output audio signal to the loudspeaker.

According to this, a sound pressure adjustment process for adjusting the sound pressure of the simulated signal is performed so that the sound pressure of each of the first frequency band and the second frequency band of the simulated signal obtained based on the second sound source signal for which sound pressure adjustment has not been performed in advance is brought close to the sound pressure of each of the first frequency band and the second frequency band in the first sound source signal for which sound pressure adjustment has been performed in advance. For this reason, even in the alarm sound based on the second sound source signal, the sound pressure in the first frequency band and the sound pressure in the second frequency band can be brought close to the sound based on the first sound source signal that has been adjusted in advance so as to satisfy the stipulation. Therefore, it is possible to adjust the sound of a sound source for which sound pressure adjustment has not been performed in advance so that a sound having a stipulated sound pressure or greater is output at a stipulated frequency.

A mobile device according to a sixth aspect of the present disclosure includes the vehicle proximity notification device according to the first aspect or the second aspect, and the loudspeaker that is specific.

It should be noted that these general or specific aspects may be realized by a system, an integrated circuit, a computer program, or a non-transitory recording medium such as a computer-readable CD-ROM, or may be realized by any combination of a system, an integrated circuit, a computer program, and a non-transitory recording medium.

In the following embodiment, a vehicle proximity notification device that can adjust the sound of a sound source for which sound pressure adjustment has not been performed in advance so that a sound having a stipulated sound pressure or greater is output at a stipulated frequency will be described.

Hereinafter, the embodiment of the present disclosure will be described with reference to the drawings. It should be noted that each embodiment described below shows a specific example of the present disclosure. Numerical values, shapes, materials, components, arrangement positions and connection forms of components, steps, order of steps, and the like shown in the following embodiment are examples and are not intended to limit the present disclosure. In addition, among the components in the following embodiment, the components not described in the independent claims indicating the broadest concept are described as arbitrary components.

EMBODIMENT

In the embodiment, a vehicle proximity notification device mounted on a vehicle will be described.

Figure 1:
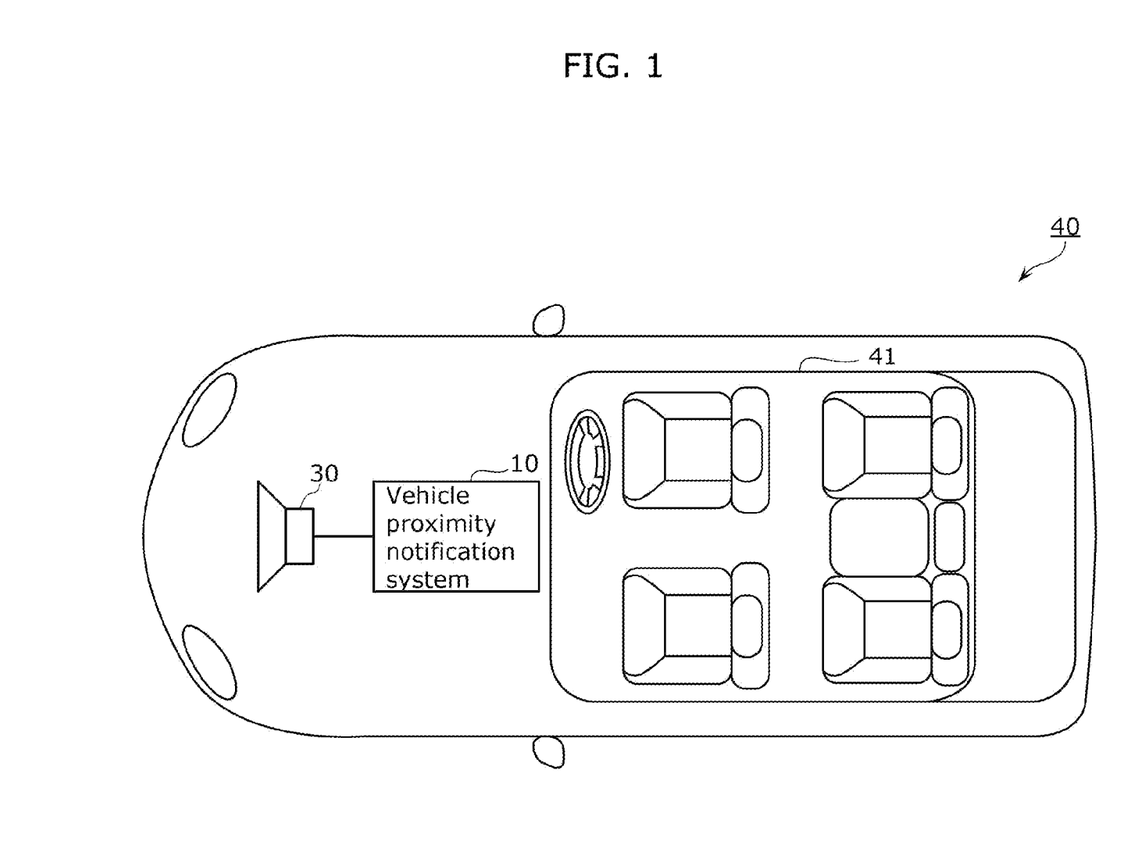
FIG. 1 is a schematic diagram of a vehicle including a vehicle proximity notification device according to an embodiment.

FIG. 1 is a schematic diagram of a vehicle including a vehicle proximity notification device according to an embodiment.

Vehicle 40 includes vehicle proximity notification device 10 and loudspeaker 30. Vehicle 40 is specifically an automobile, but is an example of a mobile device and is not particularly limited.

Loudspeaker 30 outputs sound according to the audio signal output from vehicle proximity notification device 10. Loudspeaker 30 is disposed outside the passenger compartment of vehicle 40, for example, in an engine room. Therefore, loudspeaker 30 outputs an alarm sound to the outside of vehicle 40 to inform the approach of vehicle 40. Loudspeaker 30 has a function of converting an electrical signal, which is an audio signal, into mechanical vibration, and outputs an alarm sound with a sound pressure based on the electrical signal.

It should be noted that passenger compartment 41 of vehicle 40 is a space in which the passengers of vehicle 40 enter. That is, passenger compartment 41 is a space in which the occupant of vehicle 40 exists.

[1. Configuration]

Figure 2:
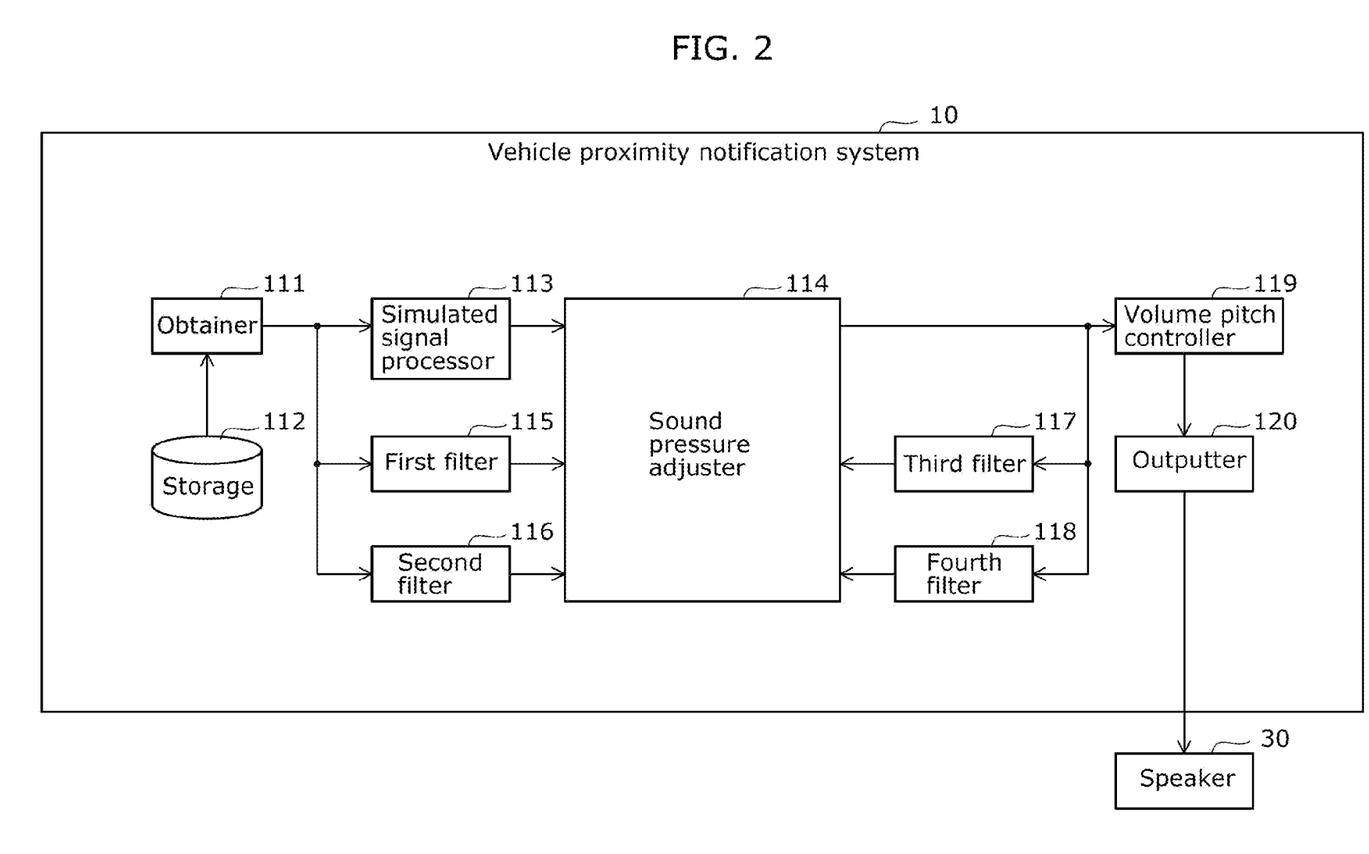
FIG. 2 is a block diagram showing an example of the functional configuration of the vehicle proximity notification device according to the embodiment.

Next, the configuration of vehicle proximity notification device 10 will be described with reference to FIG. 2 in addition to FIG. 1. FIG. 2 is a block diagram showing an example of the functional configuration of the vehicle proximity notification device according to the embodiment.

Vehicle proximity notification device 10 is a device that notifies people around vehicle 40 of the proximity of vehicle 40 by outputting an alarm sound from loudspeaker 30.

As shown in FIG. 2, vehicle proximity notification device 10 includes obtainer 111, storage 112, simulated signal processor 113, sound pressure adjuster 114, first filter 115, and second filter 116, third filter 117, fourth filter 118, volume pitch controller 119, and outputter 120. Vehicle proximity notification device 10 is realized, for example, by a processor such as a DSP and the like, but may be realized by a microcomputer or a dedicated circuit, or may be realized by a combination of two or more of a processor, a microcomputer and a dedicated circuit.

Obtainer 111 obtains the first sound source from storage 112 and generates a first sound source signal. In addition, obtainer 111 obtains the second sound source from storage 112 and generates a second sound source signal. The first sound source signal and the second sound source signal are electrical signals that are audio signals corresponding to one alarm sound that notifies the exterior of the proximity of vehicle 40. The alarm sound is, for example, engine sound. A pseudo engine sound or an electronic sound is used as the first sound source, and the first sound source signal includes frequency components of, for example, a low frequency range of 300 Hz to 800 Hz and a high frequency range of 1 kHz to 5 kHz. The first sound source generates a first audio signal indicating a first sound having a first frequency characteristic as an alarm sound. The first frequency characteristic is, for example, a frequency characteristic in which the sound pressure at first frequency F1 included in the low frequency band lower than predetermined frequency Fth is the first sound pressure or more, and the sound pressure at second frequency F2 included in the high frequency band higher than or equal to predetermined frequency Fth is the second sound pressure or more.

Predetermined frequency Fth is, for example, 1 kHz. In addition, first frequency F1 that serves as the reference for the first frequency band and second frequency F2 that serves as the reference for the second frequency band are frequencies that are not adjacent to each other among a plurality of frequency bands separated by every ⅓ octave. First frequency F1 is, for example, 630 Hz. Second frequency F2 is, for example, 1 kHz.

Storage 112 stores the first sound source signal and the second sound source signal. Storage 112 is a non-volatile storage device. The second sound source signal is an audio signal for which sound pressure adjustment has not been performed in advance so that loudspeaker 30 outputs a sound having a stipulated sound pressure or greater at a stipulated frequency.

It should be noted that the first sound source signal is audio signal output so that when the first sound source signal is output from loudspeaker 30 after a specific signal processing is applied to the first sound source signal, a sound pressure in the first frequency band is greater than a stipulated first sound pressure and that a sound pressure in a second frequency band different from the first frequency band is greater than a stipulated second sound pressure. That is, the first sound source signal is an audio signal for which sound pressure adjustment has been performed in advance so that a sound having a stipulated sound pressure or greater is output at a stipulated frequency. In other words, loudspeaker 30 emits sound having a stipulated sound pressure or greater at a stipulated frequency by sound pressure adjuster 114 applying signal processing to the first sound source signal using parameters determined by adjusting the sound pressure in advance as specific signal processing, and outputting it to loudspeaker 30.

Simulated signal processor 113 generates a simulated signal by subjecting the second sound source signal to simulated signal processing including specific signal processing and signal processing for simulating the characteristics of a specific loudspeaker. Simulated signal processor 113 does not apply simulated signal processing to the first sound source signal.

Figure 3:
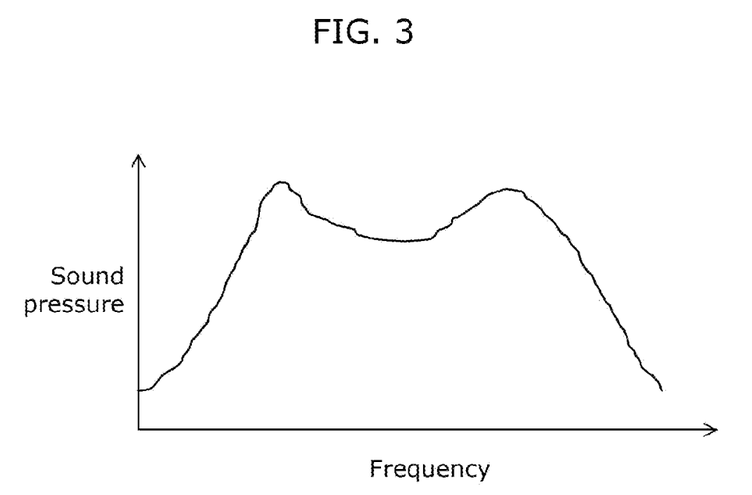
FIG. 3 is a diagram showing sound pressure frequency characteristics of the loudspeaker according to the embodiment.
Figure 4:
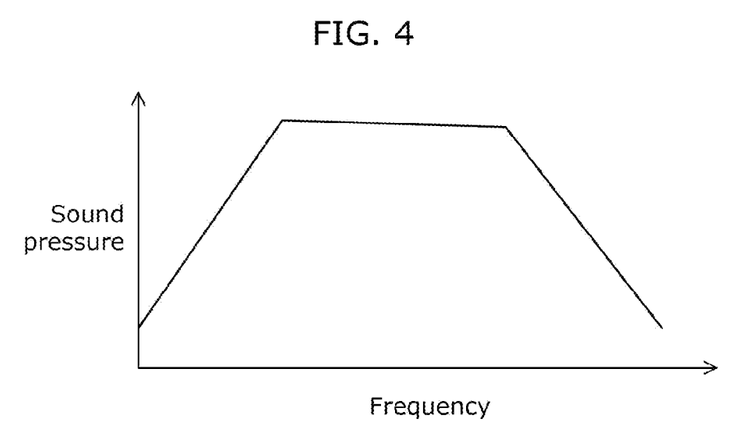
FIG. 4 is a diagram showing an example of a simulation filter for simulated signal processing that simulates the sound pressure frequency characteristics of the loudspeaker according to the embodiment.

FIG. 3 is a diagram showing sound pressure frequency characteristics of the loudspeaker according to the embodiment. FIG. 4 is a diagram showing an example of a simulation filter for simulated signal processing that simulates the sound pressure frequency characteristics of the loudspeaker according to the embodiment.

In the simulated signal processing, simulated signal processor 113 generates a simulated signal simulating the audio signal output from loudspeaker 30 by performing simulated signal processing that simulates the sound pressure frequency characteristics of loudspeaker 30 as shown in FIG. 4. Second-order high-pass/low-pass filters may be used as the simulation filters, or a loudspeaker filter such as first-order or third-order filter may be used. Any combination of a low-pass filter and no high-pass filter may be used as the simulation filter depending on the reproduction capability of loudspeaker 30. FIR filter or the like may be used as the simulation filter, and the characteristics of loudspeaker 30 may be strictly simulated.

First filter 115 generates the first audio signal by extracting the first frequency band of the first sound source signal obtained by obtainer 111. Accordingly, first filter 115 obtains the first audio signal. That is, first filter 115 also has a function as an obtainer that obtains the first audio signal.

Second filter 116 generates the second audio signal by extracting the second frequency band of the first sound source signal obtained by obtainer 111. Accordingly, second filter 116 obtains the second audio signal. That is, second filter 116 also has a function as an obtainer that obtains the second audio signal.

Sound pressure adjuster 114 performs a predetermined sound pressure adjustment on the simulated signal and generates an output audio signal after adjusting the sound pressure. Sound pressure adjuster 114 may not perform sound pressure adjustment on the simulated signal that is input first. That is, sound pressure adjuster 114 may output the first input simulated signal as the output audio signal.

Third filter 117 generates a third audio signal by extracting the first frequency band of the output audio signal (or the initial simulated signal).

Fourth filter 118 generates a fourth audio signal by extracting the second frequency band of the output audio signal (or the initial simulated signal).

Sound pressure adjuster 114 calculates a first difference between the first audio signal and the third audio signal, and calculates a second difference between the second audio signal and the fourth audio signal. Then, sound pressure adjuster 114 generates the output audio signal by adjusting the sound pressure of the simulated signal in the first frequency band and the sound pressure of the simulated signal in the second frequency band so that the first difference and the second difference become small. Specifically, sound pressure adjuster 114 adjusts the sound pressure of the simulated signal in the first frequency band and the sound pressure of the simulated signal in the second frequency band so that the first difference between the first audio signal and the third audio signal and the second difference between the second audio signal and the fourth audio signal become small by applying the least squares method (LSM) calculation.

Here, the first frequency band is included in the low frequency band lower than a predetermined frequency. In addition, the second frequency band is included in the high frequency band higher than or equal to a predetermined frequency.

Volume pitch controller 119 adjusts the volume of the output audio signal to a predetermined volume and the pitch of the output audio signal to a predetermined pitch.

Outputter 120 outputs the output audio signal adjusted by volume pitch controller 119 from loudspeaker 30. Outputter 120 may amplify the adjusted output audio signal and then output the amplified output audio signal to loudspeaker 30.

[2. Operation]

Figure 5:
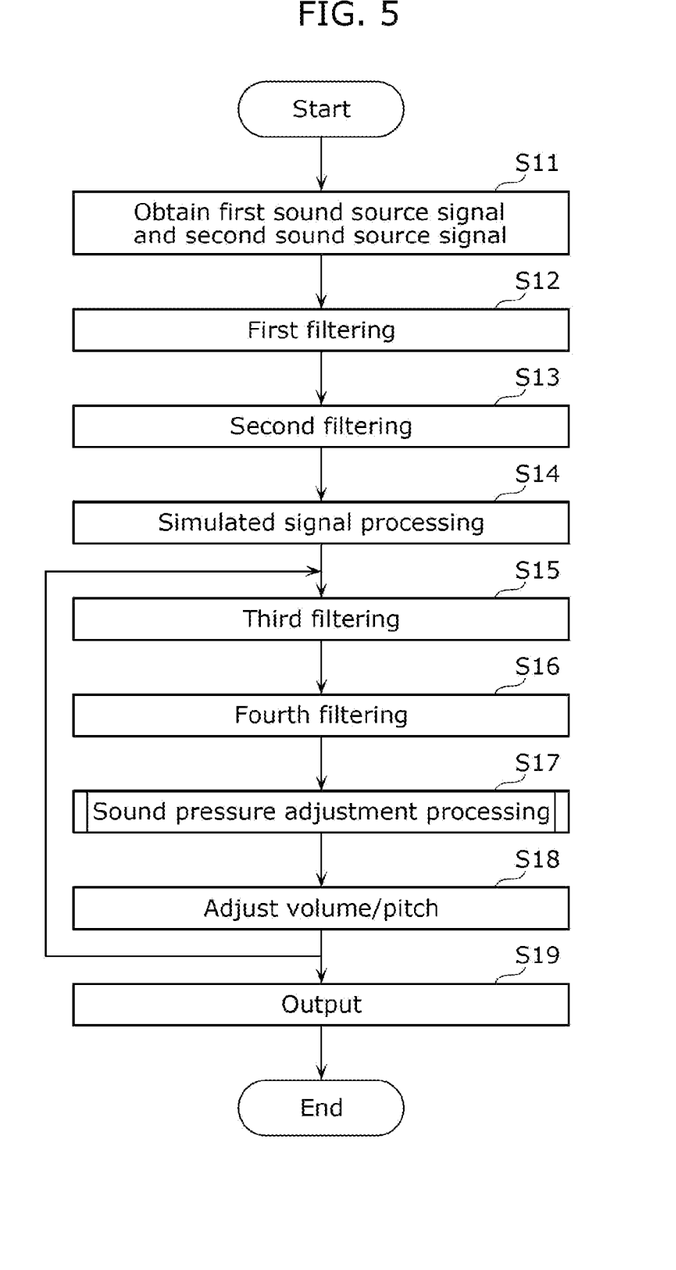
FIG. 5 is a flowchart showing an example of the operation of the vehicle proximity notification device according to the embodiment.

FIG. 5 is a flow chart showing an example of the operation of the vehicle proximity notification device according to the embodiment.

Vehicle proximity notification device 10 obtains the first sound source signal and the second sound source signal (S11).

Next, vehicle proximity notification device 10 performs first filtering processing on the first sound source signal to generate a first audio signal (S12).

Next, vehicle proximity notification device 10 performs second filter processing on the first sound source signal to generate a second audio signal (S13).

Next, vehicle proximity notification device 10 generates a simulated signal by subjecting the second sound source signal to simulated signal processing including specific signal processing and signal processing for simulating the characteristics of a specific loudspeaker (S14).

Next, vehicle proximity notification device 10 generates a third audio signal by performing third filter processing for extracting the first frequency band of the output audio signal (or initial simulated signal) (S15).

Next, vehicle proximity notification device 10 generates a fourth audio signal by performing fourth filter processing for extracting the second frequency band of the output audio signal (or initial simulated signal) (S16).

Next, vehicle proximity notification device 10 generates an output audio signal performs sound pressure adjustment processing on the second sound source signal based on the first audio signal, the second audio signal, the third audio signal, and the fourth audio signal (S17). It should be noted that steps S15 and S16 may be performed on the output audio signal after the processing of step S17.

Next, vehicle proximity notification device 10 adjusts the volume of the output audio signal to a predetermined volume and the pitch of the output audio signal to a predetermined pitch (S18).

Next, vehicle proximity notification device 10 outputs the output audio signal adjusted by volume pitch controller 119 from loudspeaker 30 (S19).

It should be noted that steps S12 and S13 may be performed after step S14. Steps S12, S13, S15 and S16 may be performed in parallel.

Figure 6:
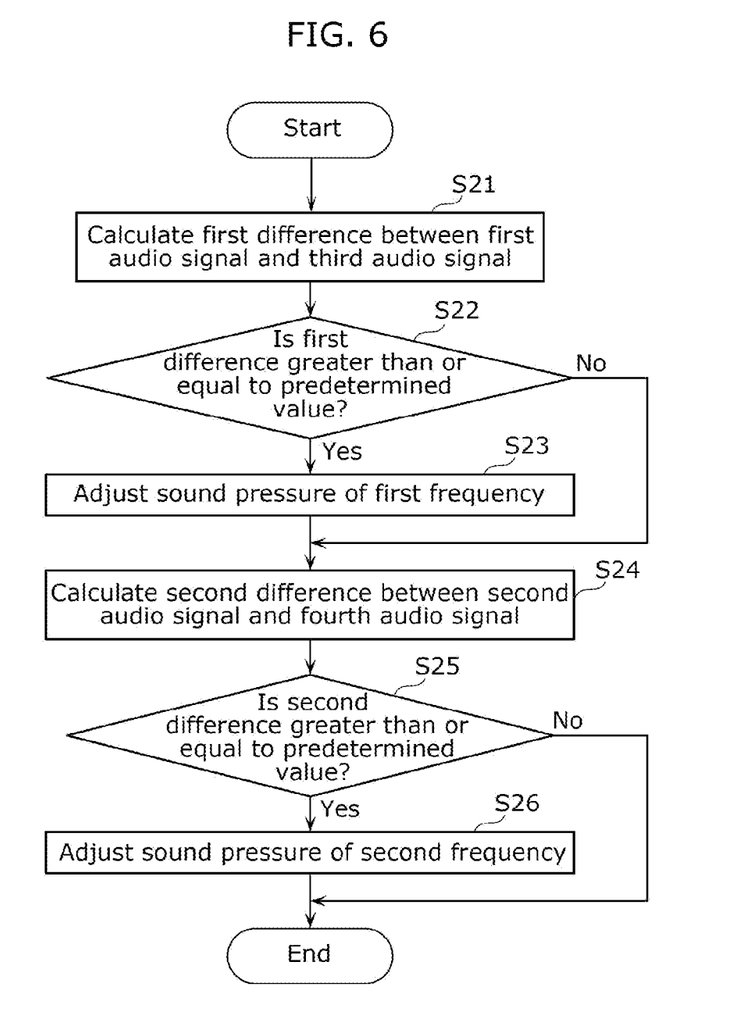
FIG. 6 is a flowchart showing a specific example of sound pressure adjustment processing according to the embodiment.

FIG. 6 is a flowchart showing a specific example of sound pressure adjustment processing according to the embodiment.

Vehicle proximity notification device 10 calculates a first difference between the first audio signal and the third audio signal (S21).

Next, vehicle proximity notification device 10 determines whether the first difference is greater than or equal to a predetermined value (S22).

When vehicle proximity notification device 10 determines that the first difference is greater than or equal to the predetermined value (Yes in S22), the sound pressure of the first frequency of the output audio signal is adjusted so as to be brought close to the sound pressure of the first frequency of the first sound source signal (S23).

When vehicle proximity notification device 10 determines that the first difference is less than the predetermined value (No in S22), or after step S23, the second difference between the second audio signal and the fourth audio signal is calculated (S24).

Next, vehicle proximity notification device 10 determines whether the second difference is greater than or equal to a predetermined value (S25).

When vehicle proximity notification device 10 determines that the second difference is greater than or equal to the predetermined value (Yes in S25), the sound pressure of the second frequency of the output audio signal is adjusted so as to be brought close to the sound pressure of the second frequency of the first sound source signal (S26).

When vehicle proximity notification device 10 determines that the second difference is less than the predetermined value (No in S25), or after step S26, the sound pressure adjustment processing ends.

It should be noted that the processing of steps S21 to S23 and the processing of steps S24 to S26 may be performed in parallel, or the processing of steps S24 to S26 may be performed prior to the processing of steps S21 to S23.

[3. Effects, Etc.]

Vehicle proximity notification device 10 according to the present embodiment notifies of proximity of vehicle 40 by causing loudspeaker 30 disposed in vehicle 40 to output an alarm sound toward the outside of vehicle 40. Vehicle proximity notification device 10 includes an obtainer, simulated signal processor 113, third filter 117, fourth filter 118, sound pressure adjuster 114, and outputter 120. The obtainer obtains the first audio signal and the second audio signal. The first audio signal is an audio signal obtained by extracting the first frequency band of the first sound source signal output so that when the first sound source signal is output after a specific signal processing is applied to the first sound source signal, a sound pressure in the first frequency band is greater than a stipulated first sound pressure and that a sound pressure in a second frequency band different from the first frequency band is greater than a stipulated second sound pressure. The second audio signal is an audio signal obtained by extracting the second frequency band of the first sound source signal. Simulated signal processor 113 generates a simulated signal by performing simulated signal processing on a second sound source signal different from the first sound source signal, the simulated signal processing including the specific signal processing and signal processing for simulating a characteristic of the loudspeaker. Third filter 117 generates a third audio signal by extracting the first frequency band of the simulated signal. Fourth filter 118 generates a fourth audio signal by extracting the second frequency band of the simulated signal. Sound pressure adjuster 114 generates an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal. Outputter 120 outputs the output audio signal to loudspeaker 30.

According to this, a sound pressure adjustment process for adjusting the sound pressure of the simulated signal is performed so that the sound pressure of each of the first frequency band and the second frequency band of the simulated signal obtained based on the second sound source signal for which sound pressure adjustment has not been performed in advance is brought close to the sound pressure of each of the first frequency band and the second frequency band in the first sound source signal for which sound pressure adjustment has been performed in advance. For this reason, even in the alarm sound based on the second sound source signal, the sound pressure in the first frequency band and the sound pressure in the second frequency band can be brought close to the sound based on the first sound source signal that has been adjusted in advance so as to satisfy the stipulation. Therefore, it is possible to adjust the sound of a sound source for which sound pressure adjustment has not been performed in advance so that a sound having a stipulated sound pressure or greater is output at a stipulated frequency.

For example, even if it is desired that a second sound source different from the first sound source prepared in advance is set as the alarm sound, the above sound pressure adjustment processing is performed, so that adjustments can be made easily so that an alarm sound that satisfies such regulations that a sound pressure is higher than or equal to the stipulated sound pressure at the stipulated frequency. Therefore, the second sound source can be set to various sound sources, and the effect of improving the degree of freedom of the alarm sound is also achieved.

In addition, vehicle proximity notification device 10 according to the present embodiment further includes first filter 115 and second filter 116. First filter 115 generates a first audio signal by extracting the first frequency band of the first sound source signal. Second filter 116 generates a second audio signal by extracting the second frequency band of the first sound source signal.

For this reason, the first audio signal and the second audio signal can be generated based on the first sound source signal. Therefore, even if the first audio signal and the second audio signal are not stored, the first audio signal and the second audio signal that have been generated can be used for the sound pressure adjustment processing by the sound pressure adjuster, so that there is no need to ensure the storage capacity of the storage device for storing the first audio signal and the second audio signal.

In addition, in vehicle proximity notification device 10 according to the present embodiment, the first frequency band is included in the low frequency band lower than a predetermined frequency. The second frequency band is included in a high frequency band higher than or equal to a predetermined frequency.

For this reason, it is possible to generate sound that satisfies regulations based on the second sound source signal.

In addition, in vehicle proximity notification device 10 according to the present embodiment, the first frequency band and the second frequency band are frequency bands that are not adjacent to each other among a plurality of frequency bands separated by every ⅓ octave.

For this reason, it is possible to generate sound that satisfies regulations based on the second sound source signal.

[Variations]

In the above embodiment, vehicle proximity notification device 10 includes first filter 115 and second filter 116, but may be configured without first filter 115 and second filter 116. In this case, storage 112 may store the first audio signal generated by performing the first filtering process on the first sound source signal in advance and the second audio signal generated by performing the second filtering process on the first sound source signal in advance. In this case, obtainer 111 obtains the first audio signal and the second audio signal that are stored in storage 112 and outputs the first audio signal and the second audio signal to sound pressure adjuster 114.

In addition, in the above embodiment, each component may be configured with a dedicated hardware or realized by executing a software program suitable for each component. Each component may be realized by a program executer such as a CPU or processor reading and executing a software program recorded on a recording medium such as a hard disk or a semiconductor memory.

In addition, each component may be a circuit (or an integrated circuit). These circuits may form one circuit as a whole, or may be separate circuits. In addition, each of these circuits may be a general-purpose circuit or a dedicated circuit.

In addition, general or specific aspects of the present disclosure may be realized by a system, a device, a method, an integrated circuit, a computer program, or a non-transitory recording medium such as a computer-readable CD-ROM. Alternatively, it may be realized by any combination of a system, a device, a method, an integrated circuit, a computer program, and a non-transitory recording medium.

For example, the present disclosure may be realized as a vehicle proximity notification method executed by a vehicle proximity notification device (computer or DSP), or may be realized as a program for causing a computer or DSP to execute the vehicle proximity notification method described above.

In addition, in the above embodiment, the processing executed by a specific processor may be executed by another processor. In addition, the order of the plurality of processes in the operation of the vehicle proximity notification device described in the above embodiment may be changed, and the plurality of processes may be executed in parallel.

In addition, forms obtained by applying various modifications to each embodiment conceived by a person skilled in the art or forms realized by arbitrarily combining the components and functions in each embodiment without departing from the spirit of the present disclosure are also included in this disclosure.

While the embodiment has been described herein above, it is to be appreciated that various changes in form and detail may be made without departing from the spirit and scope of the present disclosure as presently or hereafter claimed. Further Information about Technical Background to this Application The disclosure of the following patent application including specification, drawings, and claims are incorporated herein by reference in their entirety: Japanese Patent Application No. 2022-159930 filed on Oct. 4, 2022.

INDUSTRIAL APPLICABILITY

The present disclosure can be applied to vehicle proximity notification devices mounted on low-noise vehicles such as electric vehicles and hybrid vehicles.

The invention claimed is:

1. A vehicle proximity notification device that notifies of proximity of a vehicle by causing a loudspeaker disposed in the vehicle to output an alarm sound toward an outside of the vehicle, the vehicle proximity notification device comprising:
   a processor; and
   a memory including a program that, when executed by the processor, causes the processor to perform operations, the operations including:

obtaining a first audio signal obtained by extracting a first frequency band of a first sound source signal and a second audio signal obtained by extracting a second frequency band of the first sound source signal, the first sound source signal being applied with specific signal processing to give the first sound source signal, when output from the loudspeaker, (i) a sound pressure in the first frequency band greater than a stipulated first sound pressure and (ii) a sound pressure in a second frequency band different from the first frequency band greater than a stipulated second sound pressure;

generating a simulated signal by performing simulated signal processing on a second sound source signal different from the first sound source signal, the simulated signal processing including the specific signal processing and signal processing for simulating a characteristic of the loudspeaker;

generating a third audio signal by extracting the first frequency band of the simulated signal;

generating a fourth audio signal by extracting the second frequency band of the simulated signal;

generating an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal; and outputting the output audio signal to the loudspeaker.

2. The vehicle proximity notification device according to claim 1, wherein the operations further include:

generating the first audio signal by extracting the first frequency band of the first sound source signal; and generating the second audio signal by extracting the second frequency band of the first sound source signal.

3. The vehicle proximity notification device according to claim 1, wherein the first frequency band is included in a low frequency band lower than a predetermined frequency, and the second frequency band is included in a high frequency band higher than or equal to the predetermined frequency.

4. The vehicle proximity notification device according to claim 3, wherein the first frequency band and the second frequency band are frequency bands that are not adjacent to each other among a plurality of frequency bands separated by every ⅓ octave.

5. A mobile device comprising:

the vehicle proximity notification device according to claim 1; and the loudspeaker.

6. A vehicle proximity notification method for notifying of proximity of a vehicle by causing a loudspeaker disposed in the vehicle to output an alarm sound toward an outside of the vehicle, the vehicle proximity notification method comprising:

obtaining a first audio signal obtained by extracting a first frequency band of a first sound source signal and a second audio signal obtained by extracting a second frequency band of the first sound source signal, the first sound source signal being applied with specific signal processing to give the first sound source signal, when output from the loudspeaker, (i) a sound pressure in the first frequency band greater than a stipulated first sound pressure and (ii) a sound pressure in a second frequency band different from the first frequency band greater than a stipulated second sound pressure;

generating a simulated signal by performing simulated signal processing on a second sound source signal different from the first sound source signal, the simulated signal processing including the specific signal processing and signal processing for simulating a characteristic of the loudspeaker;

generating a third audio signal by extracting the first frequency band of the simulated signal;

generating a fourth audio signal by extracting the second frequency band of the simulated signal;

generating an output audio signal by adjusting the sound pressure in the first frequency band of the simulated signal and the sound pressure in the second frequency band of the simulated signal to reduce a first difference between the first audio signal and the third audio signal and a second difference between the second audio signal and the fourth audio signal; and outputting the output audio signal to the loudspeaker.

* * * * *